March 27, 1962 G. W. COPE 3,026,819
STABILIZED TRUCK
Filed May 29, 1961

Inventor:
Geoffrey W. Cope
By Wilmer Mechlin
his Attorney

United States Patent Office
3,026,819
Patented Mar. 27, 1962

3,026,819
STABILIZED TRUCK
Geoffrey W. Cope, Williamsville, N.Y., assignor to Symington Wayne Corporation, Salisbury, Md., a corporation of Maryland
Filed May 29, 1961, Ser. No. 113,271
12 Claims. (Cl. 105—197)

This invention relates to railway trucks of the stabilized or snubbed type in which the relative movements of a pair of members, one spring-supported on the other, is controlled by friction.

The primary object of the present invention is to provide an improved stabilized truck having double-acting friction means for controlling relative movements of a pair of spring-supported and supporting members in opposite directions.

Another object of the invention is to provide a stabilized truck wherein the relative movements of a pair of spring-supported and supporting members in opposite directions is resisted substantially uniformly by friction shoes yieldably urged toward each other against angularly related wedging faces on one of the members and into frictional engagement with a friction face on the other member.

An additional object of the invention is to provide a stabilized truck wherein the relative movements of a pair of members in opposite directions not only are resisted but the resistance is adjustable to compensate for wear.

A further object of the invention is to provide a friction device for controlling relative movements of a pair of spring-supported and supporting members of a railway truck having a pair of shoes connected by a bolt and urged by a compression spring carried by the bolt toward each other into wedging engagement with angularly related wedging faces on one of the members and frictional engagement with a friction face on the other member.

Another object of the invention is to provide a stabilized truck wherein relative movement of a pair of spring-supported and supporting members is frictionally controlled by connected friction shoes embracing obtusely disposed wedging faces on one of the members and yieldably urged thereagainst and into frictional engagement with a friction face on the other member.

A further object of the invention is to provide in a stabilized truck a double-acting friction device for controlling relative movement of a pair of members in opposite directions which is both readily assemblable and retractable into one of the members for facilitating assembly and disassembly of the members.

Other objects and advantages of the invention will appear hereinafter in the description, be particularly pointed out in the appended claims and be illustrated in the accompanying drawings, in which:

Figure 1:
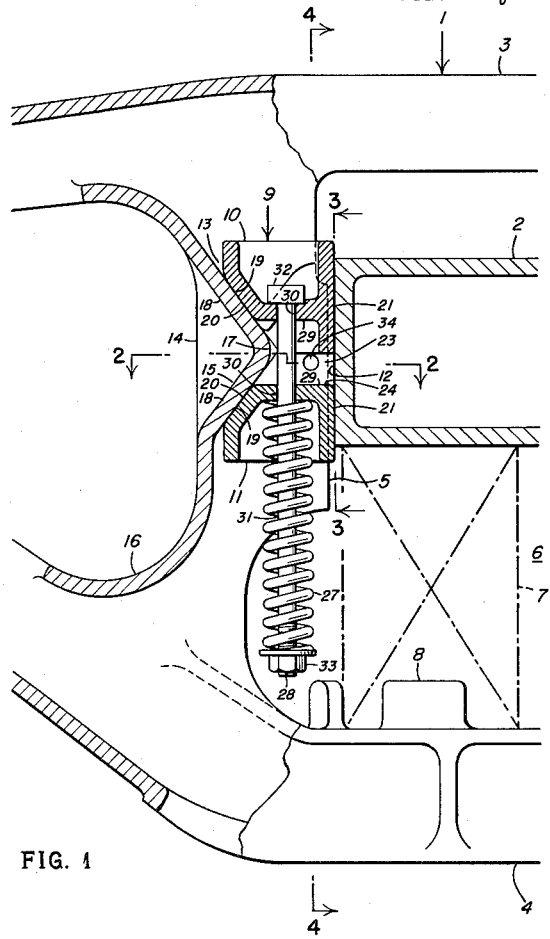
FIGURE 1 is a fragmentary side elevational view of a preferred embodiment of the stabilized truck of the present invention with portions broken away and shown in section to more clearly illustrate certain of the details of construction.
Figure 3:
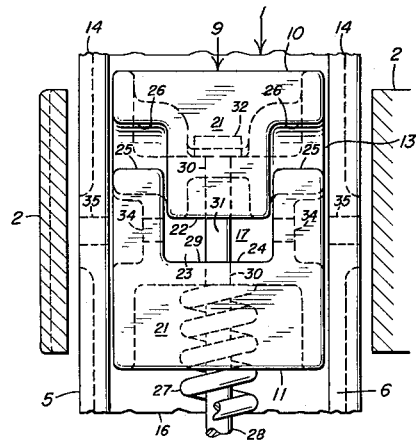
FIGURE 3 is a fragmentary vertical sectional view taken along lines 3—3 of FIGURE 1.
Figure 4:
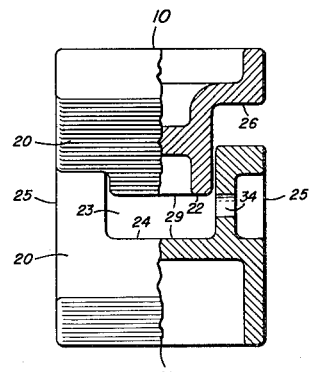
FIGURE 4 is a side elevational view of the friction shoes of the preceding figures in part in the vertical section taken along lines 4—4 of FIGURE 1.
Figure 2:
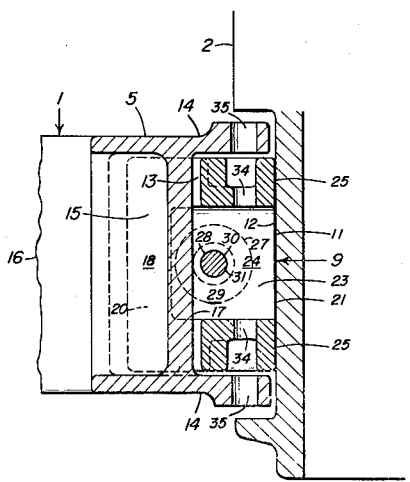
FIGURE 2 is a fragmentary horizontal sectional view taken along lines 2—2 of FIGURE 1.
Figure 5:
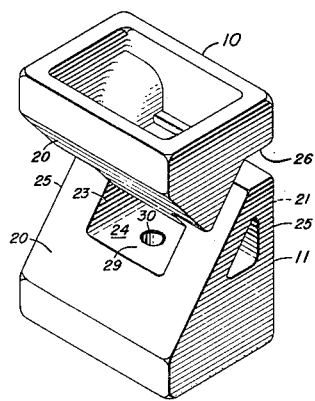
FIGURE 5 is a perspective view of the friction shoes.

Referring now in detail to the drawings in which like reference characters designate like parts, the stabilized or snubbed railway truck of the present invention, while particularly designed for friction control of the relative movements of a side frame 1 and bolster 2, as exemplified in the illustrated embodiment, is also adapted for controlling the relative movements of any other pair of members of a railway truck, one of which is spring-supported on the other, such as a side frame and journal box or even the base and cap members of a so-called package spring group. Also, since in most applications the structure at one side of the spring-supported member will be substantially duplicated at the other to enable friction control to be exerted at both, a showing, as in the drawing, and description of the structure at one side of the bolster 2 will suffice for an understanding of the invention.

As in a conventional truck for railway freight cars, the side frame 1 of the illustrated stabilized truck has vertically spaced compression and tension members 3 and 4, respectively, bounding, with horizontally or transversely spaced upright guide columns 5, a window opening 6 in which the bolster 2 is received. Also conventionally, the bolster is supported in the window opening 6 on a group of supporting coil springs 7, which in turn are supported on a spring seat 8 on the tension member 4.

For frictionally absorbing part of the energy of the supporting springs 7 and so damping or snubbing their oscillations, the truck usually will have a friction device 9 at each side of the bolster 2. Each such friction device includes a pair or plurality of friction shoes or wedges 10 and 11 pocketed in one and urged into frictional engagement with the other of the side frame and bolster members 1 and 2 and the form of these members will vary accordingly. If, as in the illustrated embodiment, the friction shoes 10 and 11 of the friction device 9 are pocketed in the side frame 1, the bolster 2 may be of conventional box construction with inboard and outboard gibs for limiting its lateral movement relative to the side frame and a flat, vertically extending or directed friction face 12 on either side between the gibs, the friction face being formed either on a wear plate fixed to the bolster or, as here, directly on the latter. With the bolster 2 of such construction, the side frame 1 pockets, accommodates or receives the friction shoes 10 and 11 of each friction device 9 in a pocket or opening 13 opening inwardly, longitudinally of the side frame, toward the window opening 6 and bounded laterally or at the sides by the column's laterally or transversely spaced inboard and outboard walls 14.

The pocket 13 is bounded outwardly, longitudinally of the side frame or away from the window opening by an intermediate portion 15 of a web 16 integral or rigid with and extending between the side frame's lateral walls. Extending transversely between and joining the inboard and outboard walls of the guide column 5, the portion 15 is dihedral and has an apex 17 pointing and sides 18 converging toward the window opening 6. Inclined or diagonally or obliquely disposed, the angularly related sides 18 of the dihedral portion 15 of the web 16, on that portion's convex or window opening-confronting side, have preferably flat or planar wedging faces 19 which are disposed at an obtuse angle to each other and extend inwardly substantially to the apex 17 and with the latter are spaced inwardly of the pocket 13 from the window or bolster opening 6.

With the apex 17 preferably substantially centered vertically on the friction face 12 at the adjoining or confronting side of the bolster 2 in the normal position of the latter, the wedging faces 19 in their turn preferably are inclined or slope at the same angle to the horizontal or vertical, so that the preferred intermediate portion 15 is a dihedral wedge disposed as a whole horizontally or normal to the friction face by virtue of that disposition of the plane bisecting the angle between its wedging faces. Each of the shoes 10 and 11 has on one side a preferably flat or planar wedging surface 20 which together embrace or straddle the wedge or intermediate portion 15 of the web 16 at opposite sides, vertically, of the apex 17 and each of which is inclined, sloped or disposed in correspondence and frictionally or wedgingly engageable with one of the wedging faces 19. On its opposite or bolster-confronting side, each shoe has a vertically extending or directed, preferably substantially flat or planar friction surface 21 frictionally engageable with the adjoining or contiguous flat or planar friction face 12 on the bolster.

Necessarily having the same angular relation to each other as the associated wedging face 19 in the pocket 13 has to the friction face 12 on the bolster 2, the wedging and friction surfaces 20 and 21 of each of the shoes 10 and 11 may be spaced vertically from those of the other shoe but preferably have an overlapping relation therewith. The overlap between the wedging and friction surfaces 20 and 21 of the two shoes 10 and 11 in turn stems from the preference for an overlap or interfit between the shoes such that they will be mutually guided, centered or aligned and prevented from jamming as they move vertically relative to or toward and away from each other to accommodate or respond to the limited transverse movement permitted the bolster 2 in the window opening 6 by the normal spacing between the sides of the bolster and the guide columns 5.

The preferred interfit or overlap between the shoes 10 and 11 is of the tongue and groove type, with a tongue 22 integral or rigid with and centered laterally on one, here the upper, shoe 10, fitting in or projecting or extending into a correspondingly centered groove, slot or bifurcation 23 in the other or lower shoe 11. Although the shoes as a whole interfit, the initial vertical or longitudinal spacing between the tongue 22 and the bottom or inner end 24 of the groove 23 on the one hand and the legs 25 on the lower shoe 11 and the abutments or shoulders 26 on the upper shoe 10 at either side of the base of the tongue on the other, is such that these confronting inner or end surfaces will not abut but remain spaced throughout the service life of the shoes. In order that the shoes may interfit without curtailment of the areas of their wedging and friction surfaces 20 and 21, the latter extend over the tongue 22 of the upper shoe 10 and the legs 25 bounding the groove 23 in the lower shoe 11.

For urging the shoes 10 and 11 inwardly toward each other to frictionally engage their wedging surfaces 20 with the wedging faces 19 on the side frame and thereby wedge their friction surfaces 21 into frictional engagement with the confronting friction face 12 on the bolster 2, there is provided spring or yieldable means preferably in the form of a coil or like spring 27 carried by and acting in compression on the shoes. The illustrated coil shoe spring 27 is particularly suited for the purpose since it can be carried or mounted on or encircle a bolt, rod or like means 28 suitable for connecting the shoes and applying the required compression to the spring, the illustrated bolt extending through apertured transverse or cross webs 29, each connecting the wedging and friction surfaces 20 and 21 of one of the shoes 10 and 11 and in and intermediate vertical or longitudinal extremities of that shoe.

With the webs 29 disposed substantially horizontally or normal to the friction surfaces 21 and the bolt-receiving apertures 30 in the webs substantially centered thereon and aligned with each other vertically or parallel to the friction surfaces, the stem 31 of the bolt necessarily will extend substantially vertically or parallel to the friction surfaces and will normally be parallel, as well, the adjoining friction face 12 on the bolster 2. The head 32 of the bolt engaging one of the webs 29 and the spring 27 encircling the stem 31 and disposed and acting between the other web and suitable abutment means, such as a nut 33 collaring the outer end of the stem, the spring, acting axially of the bolt, thus acts substantially vertically or parallel to the normally coplanar friction surfaces on the shoes. Consequently if, as in the preferred embodiment, the angularity of the wedging faces 19 with the vertical is the same, the shoes 10 or 11 will be urged with substantially equal force into frictional engagement with the friction face on the bolster. Accordingly, the friction device of this invention not only is double acting in frictionally resisting movement of the bolster in opposite, here vertical, directions parallel to the friction surfaces, but the movement in either direction is opposed positively by the wedging action on one of the shoes and the force opposing the movement in both directions is substantially the same.

The particular position of the friction or shoe spring 27 relative to the friction shoes 10 and 11 will depend on the available space and the length desired in the spring. The rate of the spring varying inversely with its length and the change in frictional resistance due to wear in turn varying with the rate, the longer the spring, the less that variation. It is therefore preferred that the shoe spring 27 be as long as possible within the limitations imposed by the available space and this, in the case of the application of the friction device to the control of the vertical movements of a bolster relative to a side frame, makes it preferable that, as in the illustrated embodiment, the bolt 28 and the shoe spring extend or project downwardly from the shoes 10 and 11 into the enlarged portion of the window opening 6 therebelow and toward but short of the spring seat 8. Even though the preferred long spring will mitigate against change in frictional resistance due to wear, some change nonetheless will occur over the service life of the friction device but this can readily be compensated for by adjusting the compression of the spring by taking up on the adjusting nut 33 or, if a fixed abutment is used, inserting one or more shims. To hold the adjustment, the nut 33 may be of the self-locking type or otherwise suitably locked against turning relative to the bolt 28. Also, any tendency of the spring 27 to exert a turning movement on the nut may be eliminated by locking the head 32 of the bolt against rotation in its seat on the web 29 in the upper shoes 10.

In assembling the truck of the illustrated embodiment, each friction unit, including the pair of friction shoes 10 and 11, bolt 28, adjusting nut 33 and shoe spring 27, is pre-assembled and inserted as a unit into one of the pockets 13 in the guide columns 5 at the sides of the window opening 6. Force is then applied by a jack or other suitable means (not shown) to retract the friction shoes of the unit into the pocket and, since the shoes are connected or interlocked by the bolt 28, a retaining pin (not shown) inserted through horizontally directed apertures 34 in one, here the lower shoe 11, and then aligned apertures 35 in the inboard and outboard walls 14 of the guide column 5 will temporarily hold both shoes in retracted position. With the temporary retaining pin in place and the means by which the shoes were retracted removed, the bolster 2 is readily insertible into position in the window opening 6 on the supporting springs 7 and, on subsequent release of the shoes by removal of the retaining pin, is frictionally resisted in movement out of that position by its engagement with the shoes.

From the above detailed description, it will be apparent that there has been provided an improved stabilized truck which, while of relatively simple and rugged construction, is effective to control the relative movement in opposite directions of a pair of spring-supported and supporting members of the truck. It should be understood that the described and disclosed embodiment is merely exemplary of the invention and that all modifications are intended to be included that do not depart from the spirit of the invention of the scope of the appended claims.

Having described my invention, I claim:

1. In a railway truck having relatively movable spring supported and supporting members, the combination of angularly related wedging faces on one of the members, a friction face on the other member angularly related to said wedging faces, friction shoes having wedging surfaces embracing and each engageable with one of said wedging faces, a friction surface on each shoe frictionally engageable with said friction face, and spring means acting inwardly on said friction shoes for urging said faces and surfaces into engagement.

2. In a railway truck having relatively movable spring-supported and supporting members, the combination of angularly related wedging faces on one of the members, a friction face on the other member angularly related to said wedging faces, friction shoes having wedging surfaces embracing and each engageable with one of said wedging faces, a friction surface on each shoe frictionally engageable with said friction face, and spring means carried by and acting inwardly on said friction shoes for urging said faces and surfaces into engagement.

3. In a railway truck having relatively movable spring-supported and supporting members, the combination of angularly related wedging faces on one of the members, a friction face on the other member angularly related to said wedging faces, friction shoes having wedging surfaces embracing and each engageable with one of said wedging faces, a friction surface on each shoe frictionally engageable with said friction face, and spring means carried by and acting in compression inwardly on said shoes substantially parallel to the friction surfaces thereof for urging said faces and surfaces into engagement.

4. In a railway truck having relatively movable spring-supported and supporting members, the combination of a friction face on one of said members, a pocket in said other member and opening toward said friction face, a dihedral wedge in said pocket and rigid with said other member, wedging surfaces on sides of said wedge converging toward and oblique to said friction face, a pair of friction shoes in said pocket and each having a wedging surface together embracing and each engageable with one of said wedging faces, a friction surface on each shoe frictionally engageable with said friction face on said one member, and spring means acting on said shoes for urging said faces and surfaces into engagement.

5. In a railway truck having relatively movable spring-supported and supporting members, the combination of a friction face on one of said members, a pocket in said other member and opening toward said friction face, a dihedral wedge in said pocket and rigid with said other member, wedging surfaces on sides of said wedge converging toward and oblique to said friction face, a pair of friction shoes in said pocket and each having a wedging surface together embracing and each engageable with one of said wedging faces, a friction surface on each shoe frictionally engageable with said friction face on said one member, means connecting said shoes, and spring means carried by said connecting means and acting inwardly on said shoes for urging said faces and surfaces into frictional engagement.

6. In a railway truck having relatively movable spring-supported and supporting members, the combination of a friction face on one of said members, a pocket in said other member and opening toward said friction face, a dihedral wedge in said pocket and rigid with said other member, wedging surfaces on sides of said wedge converging toward and oblique to said friction face, a pair of friction shoes in said pocket and each having a wedging surface together embracing and each engageable with one of said wedging faces, a friction surface on each shoe frictionally engageable with said friction face on said one member, means connecting and extending longitudinally of said shoes substantially parallel to said friction surfaces, and spring means carried by said connecting means and acting inwardly on said shoes for urging said faces and surfaces into frictional engagement.

7. In a railway truck having relatively movable spring-supported and supporting members, the combination of a friction face on one of said members, a pocket in said other member and opening toward said friction face, a dihedral wedge in said pocket and rigid with said other member, wedging surfaces on sides of said wedge converging toward and oblique to said friction face, a pair of interfitting friction shoes in said pocket and each having a wedging surface together embracing and each engageable with one of said wedging faces, a friction surface on each shoe frictionally engageable with said friction face on said one member, and spring means acting on said shoes for urging said faces and surfaces into engagement.

8. In a railway truck having relatively movable spring-supported and supporting members, the combination of a friction face on one of said members, a pocket in said other member and opening toward said friction face, a dihedral wedge in said pocket and rigid with said other member, wedging surfaces on sides of said wedge converging toward and oblique to said friction face, a pair of interfitting relatively longitudinally movable friction shoes in said pocket, normally longitudinally spaced means on said shoes for limiting inward longitudinal movement thereof, a wedging surface on each shoe together embracing and each engageable with one of said wedging faces, a friction surface on each shoe frictionally engageable with said friction face on said one member, and spring means acting on said shoes for urging said faces and surfaces into engagement.

9. In a railway truck having relatively movable spring-supported and supporting members, the combination of a friction face on one of said members, a pocket in said other member and opening toward said friction face, a dihedral wedge in said pocket and rigid with said other member, wedging surfaces on sides of said wedge converging toward and disposed at substantially the same oblique angle to said friction face, a pair of friction shoes in said pocket and each having a wedging surface together embracing and each engageable with one of said wedging faces, a friction surface on each shoe frictionally engageable with said friction face on said one member, and spring means acting on said shoes for urging said faces and surfaces into engagement.

10. In a railway truck having relatively movable spring-supported and supporting members, the combination of a friction face on one of said members, a pocket in said other member and opening toward said friction face, a dihedral wedge in said pocket and rigid with said other member, wedging surfaces on sides of said wedge converging toward and oblique to said friction face, a pair of friction shoes in said pocket and each having a wedging surface together embracing and each engageable with one of said wedging faces, a friction surface on each shoe frictionally engageable with said friction face on said one member, means connecting said shoes and extending longitudinally thereof and therebeyond substantially parallel to said friction surfaces, and a compression spring on said connecting means and extending therewith beyond said shoes, said spring acting inwardly on said shoes through said connecting means for urging said faces and surfaces into engagement.

11. In a railway truck having relatively movable spring-supported and supporting members, the combination of a friction face on one of said members, a pocket in said other member and opening toward said friction face, a dihedral wedge in said pocket and rigid with said other member, wedging surfaces on sides of said wedge converging toward and oblique to said friction face, a pair of longitudinally interfitting friction shoes in said pocket and each having a wedging surface together embracing and each engageable with one of said wedging faces, a friction surface on each shoe frictionally engageable with said friction face on said one member, a web intermediate longitudinal extremities of and extending between wedging and friction surfaces on each of said shoes, each web being disposed substantially normal to the friction surface of its shoe, longitudinally aligned apertures in said webs, rod means extending through said apertures substantially parallel to said friction surfaces and having a head engaging one and a stem projecting beyond the other of said webs, an abutment on an outer end portion of said rod means, a coil spring encircling said stem between and acting against said abutment and adjoining web, said spring acting through said rod means inwardly on said shoes for urging said faces and surfaces into engagement, and means associated with said abutment for adjusting the compression on said spring.

12. In a railway truck having a side frame and a bolster spring-supported thereon and extending into a window opening therein between transversely spaced guide columns thereof, the combination of a pocket in each guide column and opening inwardly onto said window opening, a dihedral wedge in said pocket and rigid with inboard and outboard walls of said guide column bounding sides thereof, wedging surfaces on opposite sides of said wedge and converging inwardly toward said window opening, a pair of interfitting relatively vertically movable friction shoes in said pocket and each having a wedging surface together embracing and each engageable with one of said wedging faces, a vertically directed friction surface on each shoe and frictionally engageable with a correspondingly directed friction face on a confronting side of said bolster, a bolt extending vertically through aligned apertures in and connecting said shoes, said bolt having a head engaging one and a stem projecting through and beyond the other of said shoes, an adjusting nut threaded to said stem beyond said other shoe, and a coil spring encircling said stem between said nut and other shoe and acting through said bolt inwardly vertically on said shoes for urging said faces and surfaces into engagement.

No references cited.